No. 673,921. Patented May 14, 1901.
J. P. NELSON, A. JENSEN & W. REISSNER.
COUNTER REFRIGERATOR.
(Application filed Sept. 28, 1899.)

(No Model.) 2 Sheets—Sheet 1.

Witnesses:
J. F. Groat
W. E. Ellis

Inventors:
James P. Nelson,
Andrew Jensen,
William Reissner,
By J. E. Swech Atty No. 673,921. Patented May 14, 1901.
J. P. NELSON, A. JENSEN & W. REISSNER.
COUNTER REFRIGERATOR.
(Application filed Sept. 28, 1899.)
(No Model.)
2 Sheets—Sheet 2.
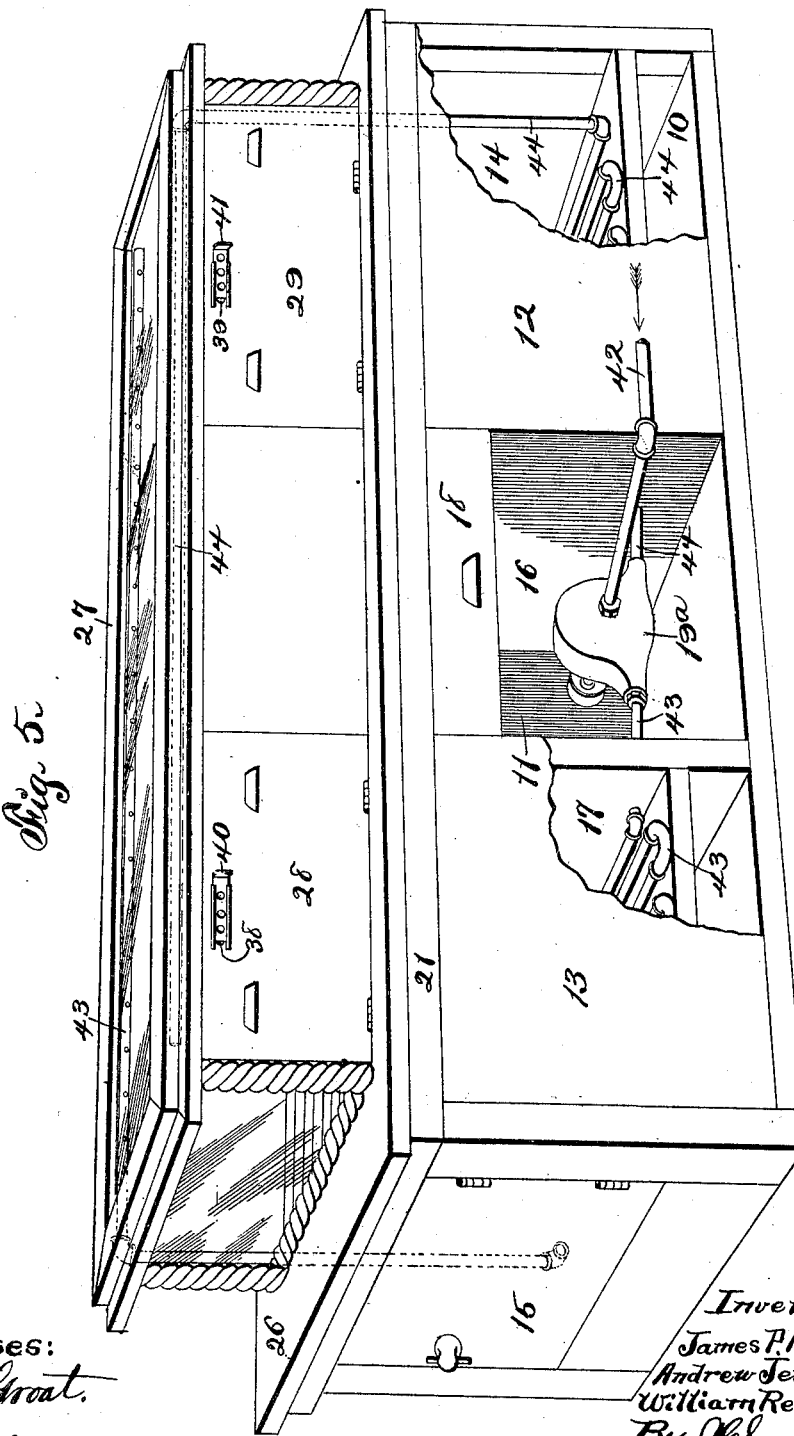
Witnesses:
J. F. Groat.
W. C. Ellis.
Inventors:
James P. Nelson,
Andrew Jensen,
William Reissner,
By Sweet
Att'y

UNITED STATES PATENT OFFICE.

JAMES P. NELSON, ANDREW JENSEN, AND WILLIAM REISSNER, OF DES MOINES, IOWA.

COUNTER-REFRIGERATOR.

SPECIFICATION forming part of Letters Patent No. 673,921, dated May 14, 1901.

Application filed September 28, 1899. Serial No. 731,992. (No model.)

*To all whom it may concern:*

Be it known that we, JAMES P. NELSON, ANDREW JENSEN, and WILLIAM REISSNER, citizens of the United States of America, and residents of Des Moines, in the county of Polk and State of Iowa, have invented certain new and useful Improvements in Counter-Refrigerators, of which the following is a specification.

The object of this invention is to provide means for exhibiting refrigerated meat, vegetables, or fruit to the view of prospective purchasers and customers and at the same time keep said meat, vegetables, or fruit under the influence of the refrigerating medium and protected from dust, air, and microbes.

Our invention consists of the construction, arrangement, and combination of elements hereinafter set forth, pointed out in our claims, and illustrated by the accompanying drawings, in which—

Figure 1:
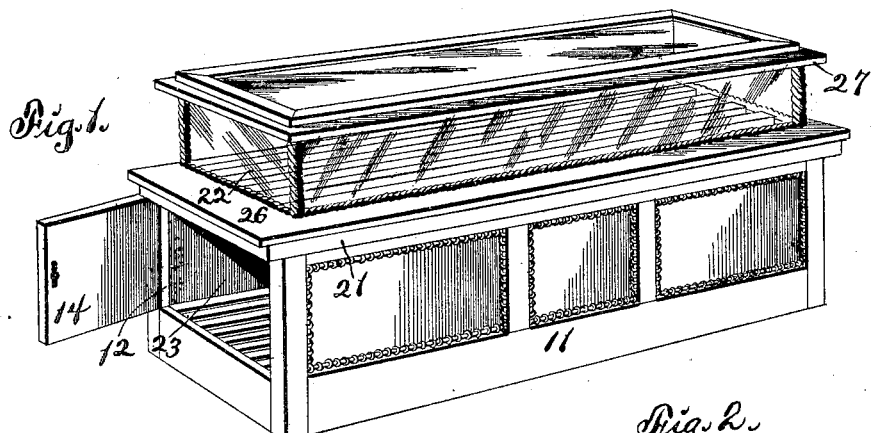
Figure 2:
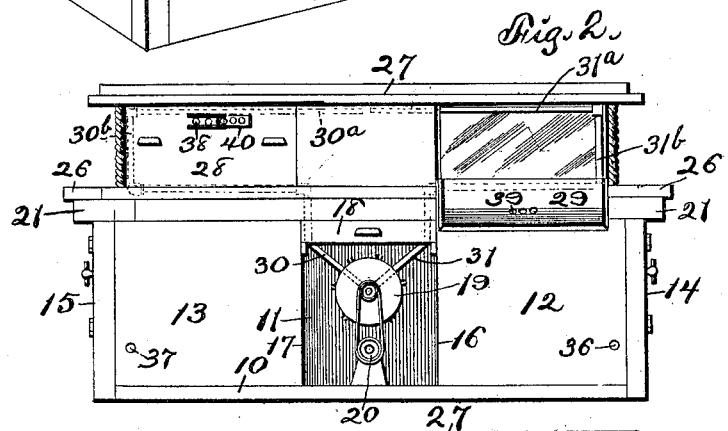
Figure 3:
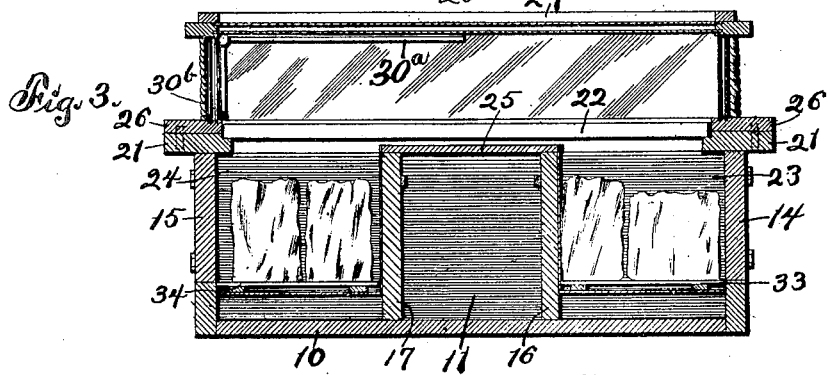
Figure 4:
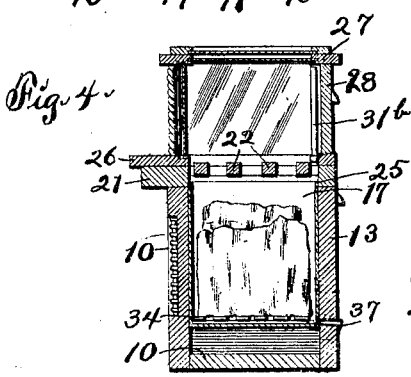

Figure 1 is a perspective of the complete device. Fig. 2 is a rear elevation of the device. Fig. 3 is a longitudinal vertical section of the device. Fig. 4 is a vertical cross-section of the device on the indicated line 4 4 of Fig. 2. Fig. 5 is a perspective illustrating the means employed to force cool air into the show-case.

In the construction of the device as shown in Figs. 1, 2, 3, and 4, the numeral 10 designates the bottom, 11 the paneled front, and 12 13 the rear walls, of a counter, the ends 14 15 of which counter being formed as doors hinged to the rear walls and latched to the front wall. The walls of the counter may be made double, if desired, and packed with mineral wool, sawdust, or other substance to obstruct the passage of heat or cold therethrough. The adjacent end portions of the rear walls of the counter are spaced apart and connected to the front wall by transverse partitions 16 17, which also may be made double and packed, thus forming a room or space for the reception of a money-drawer 18 and a blower 19 and motor 20, suitably supported in the central portion of the counter. A plancher 21 is mounted horizontally on and projects outwardly from the upper edges of the walls and ends of the counter, and said plancher is provided with upwardly-extending dowel-pins, (dotted lines.) A series of slats 22 are mounted longitudinally of and form the top of the counter and are spaced apart, Fig. 4, to form means for the circulation of air from the ice-chambers 23 24. A cover 25 is fixed to the upper ends of the transverse partitions 16 17 beneath the central portions of the slats 22. A rectangular base-frame 26 is mounted horizontally on and projects forwardly and endwise from the plancher 21 and is provided with dowel-holes to receive the pins (dotted lines) and retain the base-frame against movement laterally or longitudinally of the plancher. A show-case 27, formed and constructed without a bottom, is fixed to and rises from the base-frame 26 and is provided with doors 28 29, hinged in the rear wall thereof. The top, ends, and front of the show-case are of glass and double—that is to say, made of two plates of glass placed parallel with each other and spaced apart to provide air-spaces and prevent sweating of the glass. The blower 19 is of the character known as an "exhaust-fan" and is driven by the motor 20 at a high speed. The periphery of the casing of the blower 19 is provided with air-discharge ports, and the central portion of one end of said casing is open for the admission of air through pipes 30 31. The pipes 30 31 branch and extend laterally from the blower, and one branch, 30$^a$, extends within the show-case 27 and terminates with an open end at one side of the central portion thereof, while another branch, 30$^b$, extends within the show-case and terminates with an open end in one corner thereof. One branch, 31$^a$, of the pipe 31 extends within the show-case and terminates with an open end across the top from the branch 30$^a$, and another branch, 31$^b$, extends within the show-case and terminates in an open end in the corner thereof diagonally opposite the branch 30$^b$. The ice-chambers 23 24 may be lined with zinc sheets 32 and are provided with ice-racks or slatted trays 33 34 to receive and support the ice cakes 35. Vent-pipes 36 37 are mounted in the rear walls of the counter beneath the ice-racks 33 34 and are designed to discharge the water produced by melting of the ice and at the same time admit air to the ice-chambers 23 24. The exhaust-fan may be substituted by a force-blower under a reverse arrangement of pipes, as shown in Fig. 5, if desired.

In practical use meat, vegetables, or fruit may be placed on the slats 22, ice placed in the ice-chambers, and the blower operated. The result of the operation of the blower is to exhaust the warm and vitiated air from the show-case and compel the flow into the show-case of cool dry air from the ice-chambers, the air being supplied to the ice-chambers by the pipes 36 37. The doors of the show-case may be provided with air-ports 38 39, closable by dampers 40 41, if desired.

In the construction of the device as shown in Fig. 5 the blower 19ª is supplied with air through the pipe 42 and discharges said air through a pair of pipes 43 44, coiled in and forming racks for the ice-chambers and extended within and terminating in perforated end portions on opposite sides of the top of the show-case.

In practical use of the device, as shown in Fig. 5, the ice cake rests upon the coiled portions of the pipe 43 44 and cool the air therein during the passage thereof from the source of pure supply to the show-case.

We claim as our invention—

1. In a display-refrigerator the combination of two ice-chambers separated by a compartment, surmounted by a cover with an opening in its center provided with slats and a bottomless show-case adapted to rest on the counter and cover the open portion thereof, substantially as shown and described.

2. In a display-refrigerator an oblong-shaped case or box having ice-chambers at each end provided with doors in the short sides of the case or box, a cover thereon provided with an opening, a slatted frame set in said opening, and a removable bottomless show-case adapted to cover the opening in the cover, substantially as shown and described.

3. In a display-refrigerator a bottomless show-case having doors in one side provided with vents and the other sides and top fitted with two sheets of glass with an open space between them, said show-case adapted to fit over the slatted opening in the top of a refrigerator, substantially as shown and described.

4. In a display-refrigerator an oblong-shaped case or box having ice-chambers at each end provided with doors in the short sides of the case or box, a cover thereon provided with an opening, a slatted frame set in said opening, a removable bottomless show-case adapted to cover the opening in the cover, and means for maintaining a circulation of air therein, substantially as shown and described.

5. In a display-refrigerator an oblong-shaped case or box having ice-chambers at each end provided with doors in the short sides of the case or box, a cover thereon provided with an opening, a slatted frame set in said opening, a removable bottomless show-case adapted to cover the opening in the cover, said show-case having doors in one side provided with vents and the other sides and top fitted with two sheets of glass with an open space between them, substantially as shown and described.

6. In a display-refrigerator the combination of an oblong-shaped case or box having ice-chambers at each end with doors in the short sides of the case or box said chambers being separated by a compartment having a drawer in its upper part, an opening in the cover of the box, a slatted frame set in said opening, and a removable bottomless show-case adapted to cover the opening in the cover, substantially as shown and described.

7. In a display-refrigerator the combination of an oblong-shaped case or box having ice-chambers at each end with doors in the short sides of the case or box said chambers being separated by a compartment having a drawer in its upper part, an opening in the cover of the box, a slatted frame set in said opening, a removable bottomless show-case adapted to cover the opening in the cover, said show-case having doors in one side provided with vents and the other sides and top fitted with two sheets of glass with an open space between them, substantially as shown and described.

8. In a display-refrigerator the combination of an oblong-shaped case or box having ice-chambers at each end with doors in the short sides of the case or box said chambers being separated by a compartment having a drawer in its upper part, an opening in the cover of the box, a slatted frame set in said opening, a removable bottomless show-case adapted to cover the opening in the cover, and means for maintaining a circulation of air therein, substantially as shown and described.

9. In a display-refrigerator an oblong-shaped case or box having ice-chambers at each end provided with doors in the short sides of the case or box, a cover thereon provided with an opening, a slatted frame set in said opening, a removable bottomless show-case adapted to cover the opening in the cover, said show-case having doors in one side provided with vents and the other sides and top fitted with two sheets of glass with an open space between them, and means for maintaining a circulation of air therein, substantially as shown and described.

10. In a display-refrigerator the combination of an oblong-shaped case or box having ice-chambers at each end with doors in the short sides of the case or box said chambers being separated by a compartment having a drawer in its upper part, an opening in the cover of the box, a slatted frame set in said opening, a removable bottomless show-case adapted to cover the opening in the cover, said show-case having doors in one side provided with vents and the other sides and top fitted with two sheets of glass with an open space between them, and means for maintaining a circulation of air therein, substantially as shown and described.

11. In a display-refrigerator an oblong-shaped case or box having ice-chambers at each end provided with doors in the short sides of the case or box, a cover thereon provided with an opening, a slatted frame set in said opening, a removable bottomless show-case adapted to cover the opening in the cover, said refrigerator having pipes leading from the upper part of the show-case downwardly to an exhaust-fan situated in the aforesaid compartment and suitable means for operating said exhaust-fan, substantially as shown and described.

12. In a display-refrigerator an oblong-shaped case or box having ice-chambers at each end provided with doors in the short sides of the case or box, a cover thereon provided with an opening, a slatted frame set in said opening, a removable bottomless show-case adapted to cover the opening in the cover, having doors in one side provided with vents and the other sides and top fitted with two sheets of glass with an open space between them, said refrigerator having pipes leading from the upper part of the show-case downwardly to an exhaust-fan situated in the aforesaid compartment and suitable means for operating said exhaust-fan, substantially as shown and described.

13. In a display-refrigerator the combination of an oblong-shaped case or box having ice-chambers at each end with doors in the short sides of the case or box said chambers being separated by a compartment having a drawer in its upper part, an opening in the cover of the box, a slatted frame set in said opening, a removable bottomless show-case adapted to cover the opening in the cover, said refrigerator having pipes leading from the upper part of the show-case downwardly to an exhaust-fan situated in the aforesaid compartment and suitable means for operating said exhaust-fan, substantially as shown and described.

14. In a display-refrigerator the combination of an oblong-shaped case or box having ice-chambers at each end with doors in the short sides of the case or box said chambers being separated by a compartment having a drawer in its upper part, an opening in the cover of the box, a slatted frame set in said opening, a removable bottomless show-case adapted to cover the opening in the cover, having doors in one side provided with vents and the other sides and top fitted with two sheets of glass with an open space between them, said refrigerator having pipes leading from the upper part of the show-case downwardly to an exhaust-fan situated in the aforesaid compartment and suitable means for operating said exhaust-fan, substantially as shown and described.

15. In a display-refrigerator an oblong-shaped case or box having ice-chambers at each end provided with doors in the short sides of the case or box, a cover thereon provided with an opening, a slatted frame set in said opening, a removable bottomless show-case adapted to cover the opening in the cover, said refrigerator having pipes leading downwardly from the upper part of the show-case to an exhaust-fan situated in the aforesaid compartment, suitable means for operating said exhaust-fan and vent-pipes in each ice-chamber, substantially as shown and described.

16. In a display-refrigerator an oblong-shaped case or box having ice-chambers at each end provided with doors in the short sides of the case or box, a cover thereon provided with an opening, a slatted frame set in said opening, a removable bottomless show-case adapted to cover the opening in the cover, having doors in one side provided with vents and the other sides and top fitted with two sheets of glass with an open space between them, said refrigerator having pipes leading downwardly from the upper part of the show-case to an exhaust-fan situated in the aforesaid compartment, suitable means for operating said exhaust-fan and vent-pipes in each ice-chamber, substantially as shown and described.

17. In a display-refrigerator the combination of an oblong-shaped case or box having ice-chambers at each end with doors in the short sides of the case or box said chambers being separated by a compartment having a drawer in its upper part, an opening in the cover of the box, a slatted frame set in said opening, a removable bottomless show-case adapted to cover the opening in the cover, said refrigerator having pipes leading downwardly from the upper part of the show-case to an exhaust-fan situated in the aforesaid compartment, suitable means for operating said exhaust-fan and vent-pipes in each ice-chamber, substantially as shown and described.

18. In a display-refrigerator the combination of an oblong-shaped case or box having ice-chambers at each end with doors in the short sides of the case or box said chambers being separated by a compartment having a drawer in its upper part, an opening in the cover of the box, a slatted frame set in said opening, a removable bottomless show-case adapted to cover the opening in the cover, having doors in one side provided with vents and the other sides and top fitted with two sheets of glass with an open space between them, said refrigerator having pipes leading downwardly from the upper part of the show-case to an exhaust-fan situated in the aforesaid compartment, suitable means for operating said exhaust-fan and vent-pipes in each ice-chamber, substantially as shown and described.

JAMES P. NELSON.
ANDREW JENSEN.
WILLIAM REISSNER.

Witnesses:
S. C. SWEET,
J. F. GROAT.